United States Patent [19]

Powell, deceased

[11] 3,710,318

[45] Jan. 9, 1973

[54] ERROR DETECTION CIRCUIT

[75] Inventor: William C. Powell, deceased, late of Oklahoma City, Okla. 73127 by Joan E. Powell, administratrix

[73] Assignee: Honeywell Information System Inc., Waltham, Mass.

[22] Filed: Nov. 22, 1971

[21] Appl. No.: 200,801

[52] U.S. Cl. ............340/146.1 AB, 307/211, 328/92

[51] Int. Cl. ........................H03k 13/32, H03k 19/44

[58] Field of Search .....340/146.1 AB; 307/203, 211; 328/92

[56] References Cited

UNITED STATES PATENTS

| | | | |
|---|---|---|---|
| 3,317,753 | 5/1967 | Mayhew | 328/92 X |
| 3,541,348 | 11/1970 | Abramson | 307/211 |

*Primary Examiner*—Eugene G. Botz
*Assistant Examiner*—R. Stephen Dildine, Jr.
*Attorney*—Lloyd B. Guernsey et al.

[57] ABSTRACT

A logic circuit having nine input terminals uses four full adders and a NAND-gate to provide an output signal when signals are applied to any two or more of the input terminals.

2 Claims, 4 Drawing Figures

INVENTOR.
WILLIAM C. POWELL
BY Lloyd B. Guernsey
AGENT

| INPUTS | | | OUTPUTS | |
|---|---|---|---|---|
| C | B | A | $\bar{C}_0$ | S |
| L | L | L | H | L |
| L | L | H | H | H |
| L | H | L | H | H |
| L | H | H | L | L |
| H | L | L | H | H |
| H | L | H | L | L |
| H | H | L | L | L |
| H | H | H | L | H |

Fig. 3a

| INPUTS | | | OUTPUTS | |
|---|---|---|---|---|
| $\bar{C}$ | $\bar{B}$ | $\bar{A}$ | $C_0$ | $\bar{S}$ |
| L | L | L | H | L |
| L | L | H | H | H |
| L | H | L | H | H |
| L | H | H | L | L |
| H | L | L | H | H |
| H | L | H | L | L |
| H | H | L | L | L |
| H | H | H | L | H |

Fig. 3b

ERROR DETECTION CIRCUIT

BACKGROUND OF THE INVENTION

This invention relates to logic circuits and more particularly to logic circuits which provide an output signal when signals are applied to any two or more of nine input terminals.

Data processing systems employ magnetic tape subsystems which record data on a plurality of tracks along the length of magnetic tape. This data includes alpha-numeric data characters which are stored on the magnetic tape for use at a later time. These characters are recorded transversely across the tape with one bit of the character recorded in each of the tracks. When the data is "read" or retrieved from the magnetic tape defects in the magnetic tape or noise in the subsystem may cause errors in the retrieved data. The presence of these errors may be detected by checking the format of the signal in each of the tracks. It is possible to correct an error in the data when there is an error in only one track. When errors occur in two or more tracks the data must be re-read or other corrective measures must be taken to recover the data. It is therefore desirable to provide an alarm circuit which develops an output signal when errors occur in two or more tracks.

In presently used alarm circuits each of the tracks has a separate sensor which develops a signal when an error occurs in the track. Sensors from all of the tracks are connected to logic circuits to form an alarm circuit which develops an output signal when errors occur in two or more of the data tracks. For example, in a nine track system, nine sensors are connected so that a sensor develops a signal when an error occurs in a corresponding one of the tracks of the tape. Each of these sensors is connected to a corresponding one of the input leads to the logic circuit. The logic circuit develops an alarm output signal when two or more of the sensors provide signals to the input leads of the logic circuit. Prior art logic circuits used in the alarm circuit include a plurality of AND-gates, OR-gates and inverters. These prior art logic circuits are relatively bulky and expensive to construct. What is needed is a logic circuit which is smaller and less expensive than the prior art circuits. The present invention discloses such a logic circuit using four binary full adders and a NAND-gate. Recently developed binary full adders in integrated circuit form have two full adders in a single compact package. These integrated circuits are very small and relatively inexpensive.

It is, therefore, an object of this invention to provide a new and improved logic circuit which develops an output signal when more than one input signal is applied.

Another object of this invention is to provide an improved logic circuit having a plurality of input terminals and which develops an output signal when signals are applied to more than one input terminal, but does not develop an output signal when signals are applied to less than two input terminals.

A further object of this invention is to provide a small and inexpensive logic circuit which develops an output signal when signals are applied to more than one input terminal, but does not develop an output signal when signals are applied to less than two input terminals.

SUMMARY OF THE INVENTION

The foregoing objects are achieved in the instant invention by providing a new and improved logic circuit which uses four full adders and a NAND-gate to develop an output signal when two or more signals are applied to nine input terminals.

Other objects and advantages of this invention will become apparent from the following description when taken in connection with the accompanying drawings.

BRIEF DESCRIPTION OF THE DRAWINGS

FIGS. 3*a* and 3*b* illustrate truth tables which are useful in explaining the operation of the instant invention shown in FIGS. 1 and 2.

DESCRIPTION OF THE PREFERRED EMBODIMENT

Figure 1:
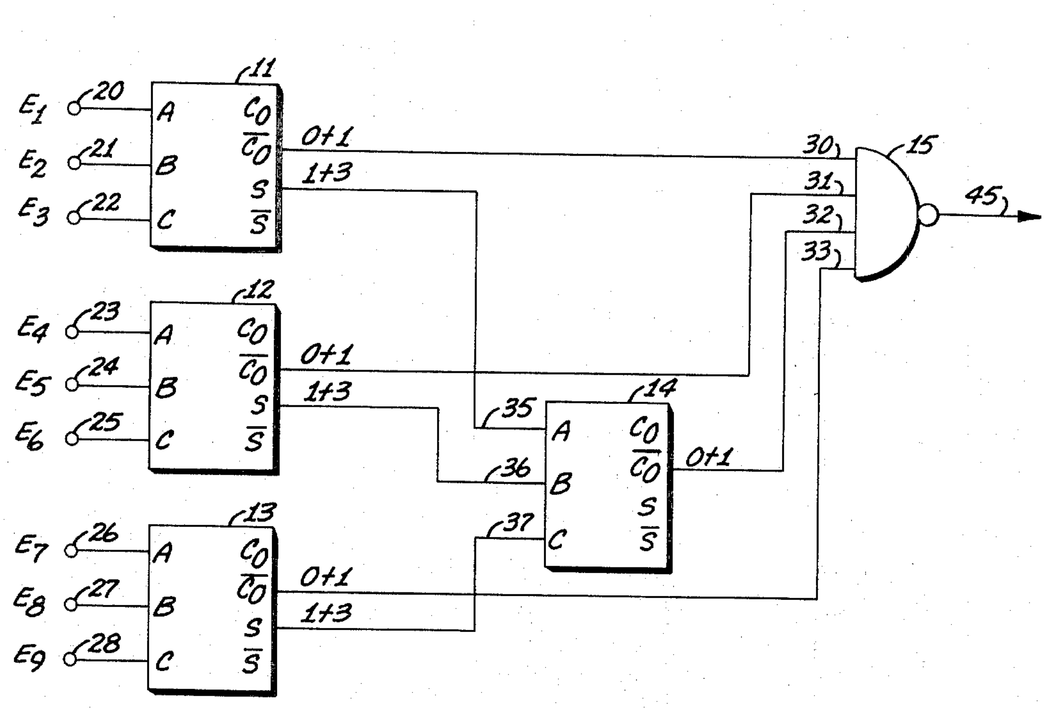
FIG. 1 is a block diagram of an embodiment of the instant invention.

Referring more particularly to the drawings by the characters of reference, FIG. 1 discloses a logic circuit which provides an output signal when two or more input signals are applied. As indicated in FIG. 1, the logic circuit includes a plurality of binary full adders 11–14 each having three input leads and a sum or S lead and a carry-not or $\overline{C}_o$ output lead. The carry-not output lead from each of the adders is connected to a corresponding one of the inputs to a NAND-gate 15. The output lead of the NAND-gate provides the alarm signal. The sum output leads from each of the full adders 11–13 are connected to a corresponding one of the three input leads to the full adder 14. The sum output from the full adder 14 is not used in this circuit. The input leads to each of the three full adders 11–13 are connected to a corresponding one of the signal input terminals 20–28.

Figure 2:
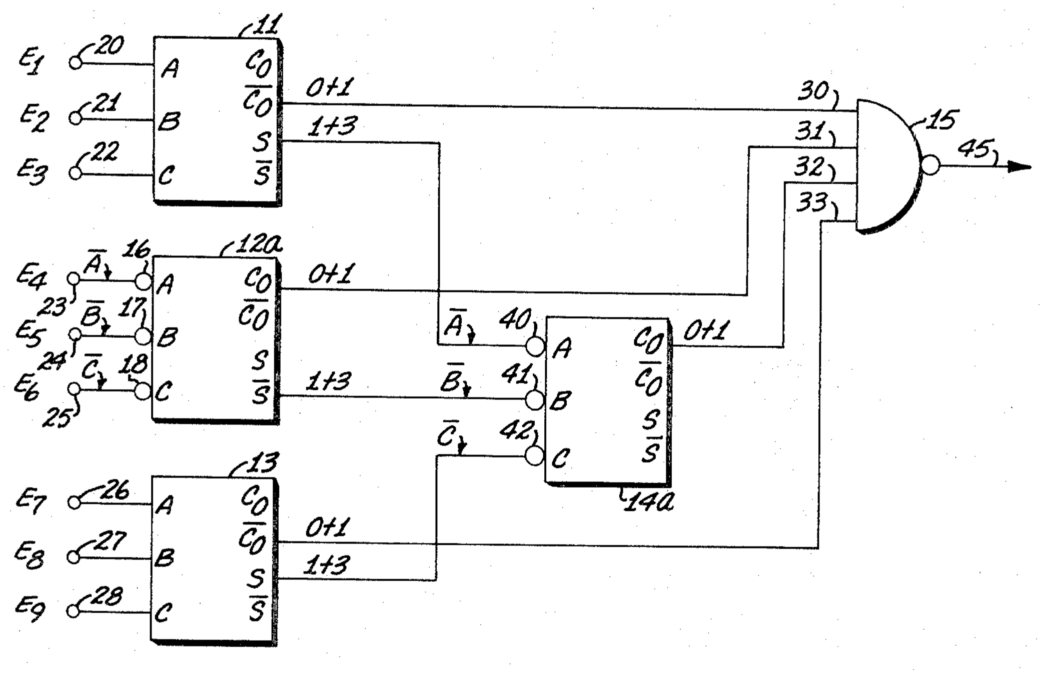
FIG. 2 is a block diagram of another embodiment of the instant invention.

The binary full adder disclosed in FIGS. 1 and 2 provides addition for signals applied to the three signal input leads. When a positive signal representing a binary one is applied to any one of the input leads A, B and C a binary one is provided at the S output lead of the adder. When signals representing binary ones are applied to two of the input leads a binary one is provided at the $C_o$ output lead and a binary zero at the S output lead. When signals representing binary ones are applied to all three of the input leads binary ones are provided at both the S output lead and the $C_o$ output lead. The $\overline{C}_o$ output lead always provides a signal which is the logical inversion of the signal on the $C_o$ output lead. For example, when the signal at the $C_o$ output lead represents a binary one the signal at the $\overline{C}_o$ output lead represents a binary zero. The $\overline{S}$ output lead of a binary full adder always provides a signal which is the logical inversion of the signal on the S output lead. A symbol 11, shown in FIG. 1, is used to represent a binary full adder. Many different logic configurations may be used to provide a binary full adder. The relationship between the state of the input signals A, B and C and the state of the output signals $\overline{C}_o$ and S is shown in the truth table of FIG. 3*a*.

The NAND-gate disclosed in FIG. 1 provides the logical NAND function for input logic signals applied to its input terminals. The NAND-gate provides an output signal having a relatively high voltage which represents a binary one when any one or more of the input signals applied thereto are low representing binary zeros. Conversely, the NAND-gate provides an output signal representing a binary zero when all of the input signals applied to its input leads represent binary ones. A symbol 15, shown in FIG. 1, is employed to represent the NAND-gate.

The operation of each of the full adders shown in FIG. 1 may be more fully understood by referring to the truth table of FIG. 3*a*. For example, when the input to each of the three input leads A, B and C of the full adder is a low (L) value of voltage representing a binary zero, the output from the sum lead of the adder will have a low (L) value of voltage representing a binary zero and the output from the carry-not output lead will have a higher (H) value of voltage representing a binary one. When any one of the three input leads A, B and C has a voltage representing a binary one the sum and carry-not output leads will each have a voltage representing a binary one. When any two of the input leads A, B and C have a voltage representing a binary one the sum and carry-not output leads will each have a voltage representing a binary zero. When all three of the input leads A, B and C have a voltage representing a binary one the sum output lead will have a voltage representing a binary zero. Thus, it can be seen that when there are no binary ones applied to any of the three input leads or when binary ones are applied to any one of the three input leads the carry-not output lead has a binary one. When a binary one is applied to any one of the three input leads or when a binary one is applied to all three input leads the sum output lead has a binary one.

When none of the signal input terminals 20–28 has a binary one the adders 11, 12 and 13 each have a binary one on the carry-not lead so that input leads 30, 31 and 33 from these adders each have a binary one applied to NAND-gate 15. The output leads from the S terminal of the adders 11, 12 and 13 each provide a binary zero to the three input leads to adder 14 so that the carry-not output from adder 14 has a binary one thereby causing the NAND-gate to have a binary zero at the output lead. When any one of the input terminals 20–28 has a binary one, one of the three adders 11–13 will have a binary one at the S output lead so that adder 14 will have a binary one on the carry-not output lead thereby providing a binary one to each of the four input leads 30–33 to NAND-gate 14 causing the output of NAND-gate 14 to have a low value voltage representing a binary zero.

Any combination of two binary ones at input terminals 20–28 will cause the output lead 45 of the NAND-gate 15 to have a high value of voltage representing a binary one. For example, if a binary one is applied to one of the leads of adder 11 and another binary one is applied to one of the input leads of adder 12 the S output lead from adder 11 and the S output lead from adder 12 will provide a binary one to two of the input leads to adder 14. The two binary ones on the input leads of adder 14 cause a binary zero at the carry-not output lead so that we have a binary zero on the input lead 32 to NAND-gate 15 thereby providing a binary one on output lead 45. If two of the input leads to any of the adders 11–13 each have a binary one the output from the carry-not lead of that corresponding adder will be a binary zero thereby causing the output voltage from NAND-gate 15 to be a binary one.

Any combination of more than two binary ones at input terminals 20–28 will also cause the circuit of FIG. 1 to provide a binary one on output lead 45. This can be shown by applying binary ones to various combinations of the input terminals 20–28 and checking the signal at output lead 45. For example, when binary ones are applied to any three of the input terminals a binary one is provided at output lead 45. When binary ones are applied to one input lead of each of the adders 11–13 a binary one is provided on leads 30, 31 and 33 to NAND-gate 15. However, there are no binary ones applied to the input leads to adder 14 so that the carry-not output lead from adder 14 provides a binary zero on input lead 32 to gate 15. The binary zero on lead 32 causes gate 15 to provide a binary one on output lead 45.

When binary ones are applied to two input leads of one adder and the third binary one is applied to an input lead of a second adder, the third adder does not receive a binary one on an input lead. This causes the third adder to provide a binary zero on an input lead to gate 15 thereby causing gate 15 to provide a binary one on output lead 45.

When binary ones are applied to four or more input terminals binary ones are applied to more than one input lead of at least one of the adders 11–13. Any adder receiving binary ones on more than one input lead develops a binary zero on the carry-not output lead. The binary zero on the carry-not output lead causes NAND-gate 15 to provide a binary one on output lead 45. Thus, when binary ones are applied to any two or more input terminals a binary one is provided at output lead 45 of FIG. 1.

FIG. 2 illustrates another embodiment of the present invention wherein a plurality of inverters 16–18 are connected between input terminals 23–25 and the input leads to adder 12*a*. An inverter provides the logical operation of inversion for an input signal applied thereto. The inverter provides a positive output signal representing a binary one when the input signal applied thereto represents a binary zero. Conversely, the inverter provides an output signal representing a binary zero when the input signal represents a binary one. Such an inverter is shown in FIG. 2 and is represented by the reference numeral 16. The relationship between the state of the input signals $\overline{A}, \overline{B}, \overline{C}$ and the state of the output signals $C_o$ and $\overline{S}$ in adders 12*a* and 14*a* of FIG. 2 is shown in the table of FIG. 3*b*.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A logic circuit which provides an output signal when more than one input signal is applied, but provides no output signal when less than two signals are applied, said circuit comprising:

first, second, third and fourth binary full adders each having first, second and third input leads, a sum output lead and a carry-not output lead;

a plurality of input terminals, each of said input terminals being connected to a corresponding one of said input leads of said first, said second and said third adders; and a NAND-gate having first, second, third and fourth input leads and an output lead, said carry-not output leads of said first, second, third and fourth adders each being connected to a corresponding one of said input leads of said gate, said sum output leads of said first, second and third adders each being connected to a corresponding one of said input leads of said fourth adder.

2. A logic circuit which provides an output signal when more than one input signal is applied, but provides no output signal when less than two input signals are applied, said circuit comprising:

first, second, third and fourth binary full adders each having first, second and third input leads and a sum, a sum-not, a carry and a carry-not output leads;

a plurality of input terminals, each of said input terminals being coupled to a corresponding one of said input leads of said first, said second and said third adders;

first, second, third, fourth, fifth and sixth inverters, said first, said second and said third inverters each being connected between said second adder and a corresponding one of said input leads of said second adder, said fourth, said fifth and said sixth inverters each being connected between said fourth adder and a corresponding one of said input leads of said fourth adder; and a NAND-gate having first, second, third and fourth input leads and an output lead, said carry-not output leads of said first and said third adders and said carry output leads of said second and said fourth adders each being connected to a corresponding one of said input leads of said gate, said sum output leads of said first and said third adders and said sum-not output lead of said second adder each being connected to a corresponding one of said input leads of said fourth adder.

* * * * *